United States Patent
Sato et al.

(10) Patent No.: US 12,057,276 B2
(45) Date of Patent: *Aug. 6, 2024

(54) SOLID ELECTROLYTIC CAPACITOR

(71) Applicant: NIPPON CHEMI-CON CORPORATION, Tokyo (JP)

(72) Inventors: Kenta Sato, Fukushima (JP); Ippei Nakamura, Fukushima (JP); Masao Sakakura, Fukushima (JP)

(73) Assignee: Nippon Chemi-Con Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/794,411

(22) PCT Filed: Jan. 20, 2021

(86) PCT No.: PCT/JP2021/001910
§ 371 (c)(1),
(2) Date: Jul. 21, 2022

(87) PCT Pub. No.: WO2021/149739
PCT Pub. Date: Jul. 29, 2021

(65) Prior Publication Data
US 2023/0335342 A1    Oct. 19, 2023

(30) Foreign Application Priority Data
Jan. 22, 2020   (JP) ................ 2020-008763

(51) Int. Cl.
| H01G 9/15 | (2006.01) |
| H01G 9/00 | (2006.01) |
| H01G 9/028 | (2006.01) |
| H01G 9/035 | (2006.01) |

(52) U.S. Cl.
CPC .......... *H01G 9/15* (2013.01); *H01G 9/0036* (2013.01); *H01G 9/028* (2013.01); *H01G 9/035* (2013.01)

(58) Field of Classification Search
None
See application file for complete search history.

(56) References Cited

U.S. PATENT DOCUMENTS

| | | | |
|---|---|---|---|
| 9,589,734 B2 * | 3/2017 | Koseki .............. | H01G 9/035 |
| 9,972,445 B2 | 5/2018 | Koseki et al. | |
| 10,563,318 B2 * | 2/2020 | Tsubaki ............ | C25D 11/12 |
| 10,566,142 B2 * | 2/2020 | Sato ................ | H01G 9/048 |
| 11,450,485 B2 * | 9/2022 | Sato ................ | H01G 9/145 |
| 11,657,982 B2 * | 5/2023 | Sato ................ | H01G 9/052 |
| | | | 361/527 |
| 2009/0109602 A1 * | 4/2009 | Kakuma ............ | H01G 9/15 |
| | | | 29/25.03 |
| 2015/0213962 A1 * | 7/2015 | Koseki .............. | H01G 9/028 |
| | | | 427/80 |
| 2015/0287540 A1 * | 10/2015 | Koseki .............. | H01G 9/035 |
| | | | 427/80 |
| 2016/0099113 A1 * | 4/2016 | Komatsu ........... | H01G 9/022 |
| | | | 29/17.3 |
| 2017/0372843 A1 | 12/2017 | Matsumoto | |
| 2018/0119306 A1 * | 5/2018 | Tsubaki ............ | H01G 9/145 |
| 2018/0218844 A1 * | 8/2018 | Sato ................ | H01G 9/151 |
| 2019/0304704 A1 * | 10/2019 | Ishimaru .......... | H01G 9/0029 |
| 2021/0142952 A1 * | 5/2021 | Sato ................ | H01G 9/035 |
| 2021/0335553 A1 * | 10/2021 | Sato ................ | H01G 9/0036 |
| 2023/0335342 A1 * | 10/2023 | Sato ................ | H01G 9/035 |

FOREIGN PATENT DOCUMENTS

| | | | | |
|---|---|---|---|---|
| CN | 103137330 A | * | 6/2013 | ......... H01G 13/00 |
| CN | 107430940 A | | 12/2017 | |
| EP | 3 826 041 A1 | | 5/2021 | |
| EP | 3 855 463 A1 | | 7/2021 | |
| JP | 2003-100559 | | 4/2003 | |
| JP | 2003100559 A | * | 4/2003 | |
| JP | 2004-265941 | | 9/2004 | |
| JP | 2009-111174 | | 5/2009 | |
| JP | 2009111174 A | * | 5/2009 | ......... H01G 11/48 |
| JP | 2013-074212 | | 4/2013 | |
| JP | 2013074212 A | * | 4/2013 | ......... H01G 11/48 |
| WO | WO2017/090241 | | 6/2017 | |

OTHER PUBLICATIONS

International Search Report (mailing date Mar. 16, 2021) for PCT/JP2021/001910, filed Jan. 20, 2021, with English language translation (4 pages).
Office Action dated Nov. 25, 2022 for Corresponding Japan Patent Application No. 2021-572775 with English Language Machine Translation.
Office Action dated Jan. 31, 2024 for Corresponding European Patent Application No. 21744530.3, 12 pages.
China First Office Action dated May 28, 2024, regarding China Patent Application No. 202180007999.0, with copy of English translation.

* cited by examiner

*Primary Examiner* — Dion R. Ferguson
(74) *Attorney, Agent, or Firm* — Snell & Wilmer LLP

(57) ABSTRACT

A hybrid-type solid electrolytic capacitor which suppresses corrosive reaction even if chlorine ions are contaminated while suppressing deterioration of product characteristics. The solid electrolytic capacitor includes a capacitor element including an anode foil and a cathode foil facing each other and an electrolyte layer formed in the capacitor element. The electrolyte layer includes a solid electrolyte layer including a dopant and a conjugated polymer, and an electrolyte solution filled in air gaps in the capacitor element on which the solid electrolyte layer is formed. The electrolyte layer includes a cation component at a molecular ratio of 6 or less relative to 1 mol of a functional group which can contribute to a doping reaction of the dopant, and the electrolytic solution includes a sulfolane-based solvent.

10 Claims, No Drawings

SOLID ELECTROLYTIC CAPACITOR

CROSS-REFERENCE TO RELATED APPLICATIONS

This application is a 371 National Stage Entry of PCT application PCT/JP2021/001910, filed Jan. 20, 2021, entitled "SOLID ELECTROLYTIC CAPACITOR", which is based upon and claims the benefit of priority from Japan Patent Application No. 2020-008763, filed on Jan. 22, 2020, both of which are hereby expressly incorporated by reference in their entireties.

FIELD OF INVENTION

The present disclosure relates to a hybrid-type solid electrolytic capacitor that utilizes both a solid electrolyte and electrolytic solution.

BACKGROUND

An electrolytic capacitor that utilizes valve-acting metal, such as tantalum or aluminum, can be made compact and large capacity by shaping the valve-action metal as an anode-side opposing electrode into a sintered component or an etching foil to increase the surface of a dielectric. In particular, in addition to compact size, large capacity, and low equivalent series resistance, a solid electrolytic capacitor in which a dielectric oxide film is covered with a solid electrolyte has characteristics such as it can be easily made as a chip and its surface can is suitable to be implemented as the surface. Hence, it is essential for downsizing, higher performance, and cost reduction of electronic devices.

Example known solid electrolytes are manganese dioxide and 7,7,8,8-tetra-cyano-quinodimethane (TCNQ) complex. In recent years, conductive polymer derived from monomers that have n-conjugated double bond, such as poly(3,4-ethylene-dioxythiophene) (PEDOT) which has an excellent adhesion property with dielectric oxide film, are rapidly becoming popular as a solid electrolyte. Polyanions such as organic sulfonic acid are used as dopant for the conductive polymers at the time of chemical oxidation polymerization or electrolytic oxidation polymerization, to realize high conductivity.

However, in comparison with liquid-type electrolytic capacitors which have a capacitor element impregnated with an electrolytic solution and which does not have a solid electrolyte layer, the solid electrolytic capacitor has insufficient repair action for defective portions of the dielectric oxide film. Hence, a so-called hybrid-type solid electrolyte capacitor, in which has a solid electrolyte layer formed on a capacitor element having an anode foil and a cathode foil facing with each other and electrolytic solution is impregnated in pores within the capacitor element, is getting attention (e.g., refer Patent Document 1).

PRIOR ART DOCUMENT

Patent Document

Patent Document 1: JP 2006-114540A

SUMMARY OF INVENTION

Problems to be Solved by Invention

Halogen ions such as chlorine ions may be contaminated in the hybrid-type solid electrolytic capacitors. Chlorine ions have dissolving action for dielectric oxide film. Hence, when the dissolving action by halogen ions exceeds the repair action for the by electrolytic solution, corrosive deterioration of the dielectric oxide film occurs. Although countermeasures such as reducing amounts of chlorine ions peculiar to material, such as an electrode foil, a separator, and a sealing body, as much as possible, and preventing contamination of chlorine ions during a manufacturing process are adopted, it is difficult to make the contamination amount of chlorine ions in the solid electrolytic capacitor to be zero.

The inventors have found that the dissolving action for the dielectric oxide film due to chlorines ion is suppressed when the moisture percentage of the electrolytic solution is increased. Moreover, the inventors have also found that the dissolving action for the dielectric oxide film due to chlorine ions is suppressed when γ-butyrolactone is used as a solvent. Furthermore, the inventors have found that the dissolving action for the dielectric oxide film is suppressed when a solute amount of the electrolyte is increased.

However, when the moisture percentage in the solid electrolytic capacitor is increased, the deterioration of the solid electrolyte layer is facilitated, and there is possibility that the adhesion between the electrode foil and the solid electrolyte layer is deteriorated, increasing an ESR. Moreover, although, when ethylene glycol is used as the solvent, the electrical conductivity of the conductive polymer is improved by change in the higher-order structure of the conductive polymer and by reorientation of the crystal structure of a polymer chain, such effects are not obtained from γ-butyrolactone. Accordingly, when γ-butyrolactone is used as the solvent, the characteristic deterioration of capacitance becomes remarkable in comparison with a case in which ethylene glycol is used.

Furthermore, the inventors have found that when, in particular, cation components are increased in the electrolyte, after thermal stress is applied to the solid electrolytic capacitor, the ESR keenly increases. Hence, the inventors proposed to reduce the amount of the cation component, however, when the amount of cation component is reduced, the dissolving action for the dielectric oxide film due to chlorine ions likely occurs. Moreover, when the solute amount is reduced, the electrolytic solution is likely to solidify under low-temperature environment, and thus the characteristic deterioration of the capacitance becomes remarkable.

Thus, a solid electrolytic capacitor which can suppress corrosive reaction even if chlorine ions are contaminated while considering the ESR after thermal stress and the capacitance under high-temperature environment, and low-temperature environment has not been proposed yet.

The present disclosure has been proposed to address the above-described problems, and an objective is to provide a hybrid-type solid electrolytic capacitor which suppresses corrosive reaction even if chlorine ions are contaminated while suppressing deterioration of product characteristics.

Means to Solve the Problem

Upon keen research, the inventors have found that when the cationic component is included at a molecular ratio of 6 or less relative to 1 mol of a functional group which can contribute to a doping reaction of the dopant, an increase in the ESR after thermal stress is applied can be suppressed. Furthermore, the inventors have found that although corrosion may easily occur due to chlorine ions because the solute amount decreases, by using sulfolane-based solvent, the disadvantage due to reduction of the solute amount can be eliminated, the corrosion due to chlorine ions can be suppressed, and the capacitance under low-temperature environment becomes excellent.

The present disclosure is based on this discovery, and a solid electrolytic capacitor of the present disclosure includes:
a capacitor element including an anode foil and a cathode foil facing each other; and
an electrolyte layer formed in the capacitor element, wherein:
the electrolyte layer includes:
a solid electrolyte layer including a dopant and a conjugated polymer; and
an electrolyte solution filled in air gaps in the capacitor element on which the solid electrolyte layer is formed,
the electrolyte layer includes a cation component at a molecular ratio of 6 or less relative to 1 mol of a functional group which can contribute to a doping reaction of the dopant, and
the electrolytic solution includes a sulfolane-based solvent.

The electrolyte layer may include aliphatic carboxylic acid in which a carbon number of a main chain is 4 or more as an anion component. In this case, the cation component may be included at the molecular ratio of 3.5 or less relative to 1 mol of the functional group capable of contributing to the doped reaction of the dopant.

The aliphatic carboxylic acid may be azelaic acid. In this case, the cation component may be included at the molecular ratio of 1.4 or less relative to 1 mol of the functional group capable of contributing to the doped reaction of the dopant.

The anion component may be included at an equimolar amount to the cation component.

The electrolytic solution may include ethylene glycol together with the sulfolane-based solvent, and a mixing ratio of the sulfolane-based solvent relative to a total amount of the sulfolane-based solvent and the ethylene glycol may be 25 wt % or more.

The sulfolane-based solvent may be at least one selected from sulfolane, 3-methyl-sulfolane, and 2,4-dimethyl-sulfolane.

The solid electrolyte layer may include sorbitol.

Effect of Invention

According to the present disclosure, in a solid electrolytic capacitor that utilizes both a solid electrolyte and electrolytic solution, deterioration of product characteristics and corrosive reaction due to chlorine ions can be both suppressed.

EMBODIMENTS

A solid electrolytic capacitor according to an embodiment of the present disclosure will be described below. Note that the present disclosure is not limited to the embodiment described below.
(Entire Configuration)
A solid electrolytic capacitor is a passive element that performs charging and discharging of electrical charge by capacitance, and is classified into a so-called hybrid-type solid electrolytic capacitor using both a solid electrolyte and electrolytic solution. Hereinafter, the hybrid-type solid electrolytic capacitor is just referred to as the solid electrolytic capacitor.

The capacitor element of the solid electrolytic capacitor includes an anode foil, a cathode foil, a separator, and an electrolyte layer. The anode foil and the cathode foil face each other via the separator. Dielectric oxide film is formed on a surface of the anode foil. Dielectric oxide film may be also formed on the cathode foil if necessary. The electrolyte layer includes the solid electrolyte layer and the electrolytic solution. The solid electrolyte layer is interposed between the anode foil and the cathode foil, and closely contacts with the dielectric oxide film. Air gaps within the capacitor element formed by the anode foil, the cathode foil, the separator, and the solid electrolyte layer are filled with the electrolytic solution.

An example manufacturing method of the solid electrolytic capacitor in outline is as follows. Firstly, as a first step, the anode foil which has the dielectric oxide film formed on the surface, and the cathode foil are wound via the separator to form the capacitor element, and repair chemical conversion is performed on the capacitor element. Next, as a second step, the solid electrolyte layer is formed on the capacitor element. In this step, the capacitor element is impregnated with dispersion or solution that include, for example, particles or powders of conductive polymer and a solvent. Subsequently, as a third step, the capacitor element is immersed in an electrolytic solution. Finally, as a fourth step, after sealing an opened end of an external casing to which the capacitor element is inserted by a sealing member, aging is performed to form the solid electrolytic capacitor.
(Electrode Foil)

The anode foil and the cathode foil are a long-length foil bodies formed of valve action metal. For example, the valve action metal is aluminum, tantalum, niobium, niobium oxide, titanium, hafnium, zirconium, zinc, tungsten, bismuth, and antimon. A purity of the anode foil is preferably 99.9% or more, and a purity of the cathode foil is preferably 99% or more, however, impurities such as silicon, iron, copper, magnesium, and zinc, etc., may be included.

The anode foil is a sintered body which was produced by sintering powders of the valve action metal or an etched foil produced by performing an etching process to an extended foil, and surfaces thereof is enlarged. The surface-enlarged structure is formed of tunnel-shape pits, spongy pits, or air gaps between dense powders. Typically, the surface-enlarged structure is formed by DC etching or AC etching which apply direct current or alternating current in an acidic aqueous solution in which halogen ions such as hydrochloric acid is present, or by vapor depositing or sintering metal particles, etc., to a core. Vapor deposition, sintering, or etching may be performed to the cathode foil to form the surface-enlarged layer Typically, the dielectric oxide film is oxide film formed on the surface layer of the anode foil, and when the anode foil is made of aluminum, the dielectric oxide film is aluminum oxide which is an oxidized porous structure region. The dielectric oxide film is formed by a chemical conversion process that applies a voltage in an aqueous solution, such as adipic acid, boric acid, or phosphoric acid. Moreover, thin dielectric oxide film (substantially 1 to 10 V) may be formed on a surface layer of the cathode foil by a chemical conversion process if necessary. Furthermore, the dielectric oxide film may be produced using a layer of metal nitride, metal carbide, or metal carbonitride formed by vapor deposition, or using material that has a surface containing carbon.
(Separator)

Separators may be celluloses such as kraft, manila hemp, esparto, hemp, rayon, and combinations thereof, polyester resin such as polyethylene terephthalate, polybutylene terephthalate, polyethylene naphthalate, and derivatives thereof, polytetrafluoroethylene resin, polyvinylidene fluoride resin, vinylon resin, polyamide resin such as aliphatic polyamides, semi-aromatic polyamides, and fully aromatic polyamides, polyimide resin, polyethylene resin, polypropylene resin, trimethylpentane resin, polyphenylene sulfide resin, acryl resin, and polyvinyl alcohol resin, and said resin may be used in single or in combination.

(Electrolyte Layer)

The electrolyte layer includes a solid electrolyte layer and electrolytic solution. The solid electrolyte layer includes a conjugated polymer and a dopant. Either one of or both of the solid electrolyte layer and the electrolytic solution include cation component. At least anion component is added to the solvent of the electrolytic solution.

The conjugated polymer or the doped conjugated polymer is also referred to as a conductive polymer. The conjugated polymer of the solid electrolyte layer is obtained by performing chemical oxidation polymerization or electrolytic oxidation polymerization on the monomer having n-conjugated double bond or the derivative thereof. The conductivity is expressed by adding a little amount of acceptors that easily accept electrons or donors that easily give electrons to the conjugated polymer. When the acceptor or the donor is added to the conjugated polymer, in the case of the acceptor, n-electron is drawn from the conjugated polymer and a positive charged carrier (hole) is produced, and in the case of the donor, electron is supplied and a negative charged carrier is produced, thereby expressing conductivity.

As the conjugated polymer, conventionally well-known polymers may be used without any limitation. For example, the conjugated polymer may be polypyrrole, polythiophene, polyfuran, polyaniline, polyacetylene, polyphenylene, polyphenylenevinylene, polyacene, and polythiophenevinylene, etc. These conjugated polymers may be used in single or in combination of two or more, and further may be copolymers of two or more types of monomers.

Among above conjugated polymers, the conjugated polymer formed by polymerizing thiophenes or derivatives thereof is preferable, and the conjugated polymer formed by polymerization of 3,4-ethylenedioxythiophene (i.e. 2,3-dihydrothieno[3,4-b][1,4]dioxine), 3-alkylthiophene, 3-alkoxythiophene, 2-alkyl-4-alkoxythiophene, 3,4-alkylthiophene, and 3,4-alkoxythiophene, or derivatives thereof are preferable. As the thiophene derivatives, compounds selected from thiophenes having substituents at third and fourth positions are preferable, and the substituents at the third and fourth positions in the thiophene ring may form a ring together with carbon at the third and fourth positions. Number of carbons in alkyl groups and alkoxy groups is suitably 1 to 16, and in particular, a polymer of 3,4-ethylenedioxythiophene which is called EDOT, that is, poly(3,4-ethylenedioxythiophene) which is called PEDOT is particularly preferable. In addition, alkylated 3,4-ethylenedioxythiophene, that is 3,4-ethylenedioxythiophene to which alkyl group is added, may be used, and for example, methylated ethylenedioxythiophene (i.e. 2-methyl-2,3-dihydro-thieno[3,4-b][1.4]dioxine), ethylated ethylenedioxythiophene (i.e. 2-ethyl-2,3-dihydro-thieno[3,4-b][1.4]dioxine) may be used.

As the dopant, conventionally well-known dopants may be used without any limitation. For example, the dopant may be inorganic acid such as boric acid, nitric acid, and phosphoric acid, and organic acid such as acetic acid, oxalic acid, citric acid, ascot acid, tartaric acid, squaric acid, rhodizonic acid, croconic acid, salicylic acid, p-toluenesulfonic acid, 1,2-dihydroxy-3,5-benzenesulfonic acid, methanesulfonic acid, trifluoromethanesulfonic acid, borodisalicylic acid, bisoxalateborate acid, sulfonylimide acid, dodecylbenzenesulfonic acid, propylnaphthalenesulfonic acid, and butylnaphthalenesulfonic acid. In addition, polyanions may be polyvinylsulfonic acid, polystyrenesulfonic acid, polyarylsulfonic acid, polyacrylsulfonic acid, polymethacrylsifonic acid, poly(2-acrylamide-2-methylpropanesulfonic acid), polyisoprenesulfonic acid, polyacrylic acid, polymethacrylic acid, and polymaleic acid.

The dopant may be used in single or in combination of two or more. In addition, the dopant may be a polymer of one type of monomer, or may be a copolymer of two or more types of monomers. Furthermore, as for the dopant, polymeric or monomeric substance may be used.

The formation method of the solid electrolyte layer is not particularly limited, and for example, the solid electrolyte layer may be formed by impregnating the capacitor element with dispersion solution including particles or powder of the conductive polymer, and applying the conductive polymer to the dielectric oxide film layer. To facilitate the impregnation in the capacitor element, depressurizing and pressurizing may be performed, if necessary. The impregnation may be repeated for several times. A solvent of the dispersion solution of the conductive polymer is removed by transpiration by drying, if necessary. Heat drying and vacuum drying may be performed, if necessary.

For example, the dispersion solution may be obtained by adding the monomer, the acid or the alkaline metal salt thereof which release the dopant, and an oxidant, stirring them until chemical oxidative polymerization is completed, and then removing the oxidant and the residual monomer by purification such as ultrafiltration, cation exchange, and anion exchange. The oxidant may be trivalent iron salt such as iron(III) p-toluenesulfonate, iron(III) naphthalenesulfonate, and iron(III) anthraquinonesulfonate, or peroxodisulfate such as peroxodisulfuric acid, ammonium peroxodisulfate, and sodium peroxodisulfate, and the oxidant may be single compound or the combination of two or more compounds. Although not strictly limited, the polymerization temperature is generally 10 to 60° C. The polymerization time is generally 10 minutes to 30 hours.

Furthermore, for example, the dispersion solution may be obtained by adding the monomer and the acid or the alkaline metal salt thereof which release the dopant, performing electrolytic oxidative polymerization to them while stirring, and then removing the residual monomer by purification such as ultrafiltration, cation exchange, and anion exchange. The electrolytic oxidative polymerization is performed by one of constant potential scheme, constant current scheme, and potential sweeping scheme. The potential of 1.0 to 1.5 V relative to a saturated calomel electrode is preferable in the case of the constant potential scheme, the current value of 1 to 10000 $\mu$A/cm$^2$ is preferable in the case of constant current scheme, and the sweeping rate of 5 to 200 mV/s in the range of 0 to 1.5 V relative to the saturated calomel electrode is preferable in the case of potential sweeping scheme. Although not strictly limited, the polymerization temperature is generally 10 to 60° C. The polymerization time is generally 10 minutes to 30 hours.

Here, it is preferable that the solid electrolyte layer includes polyethylene glycol or sorbitol. In particular, it is preferable that the solid electrolyte layer include sorbitol. Polyethylene glycol or sorbitol may be included in the solid electrolyte layer by, for example, adding them to the dispersion solution for forming the solid electrolyte layer. As described later, regarding the electrolytic solution, when a sulfolane-based solvent that includes sulfolane or cyclic sulfone structure is selected as the solvent, and the solid electrolyte layer includes polyethylene glycol or sorbitol, a decrease of the capacitance after the electrolytic solution was left under low-temperature environment as cold as −55° C. for a long time can be suppressed. In particular, when sorbitol is added, the decrease of the capacitance after being left under the low-temperature environment for a long time is remarkably suppressed.

Although it is not limited to this reason, the reason why the decrease of the capacitance after being left under the low-temperature environment for a long time is suppressed by the combination of the sulfolane-based solvent and the polyethylene glycol or sorbitol is thought to be as follows. That is, sorbitol exhibits an effect of suppressing the decrease of the capacitance under the low-temperature environment. However, when the solvent for the electrolytic solution is a protic solvent that has OH group such as ethylene glycol, sorbitol is hydrogen-bonded with the protic solvent, and the effect of suppressing the decrease of the capacitance under the low-temperature environment would not be exhibited. On the other hand, the sulfolane-based solvent is an aprotic solvent without OH group. Hence, sorbitol does not interact with the sulfolane-based solvent, and the effect of suppressing the decrease of the capacitance under the low-temperature environment is exhibited.

Moreover, the reason why the decrease of the capacitance after being left under the low-temperature environment for a long time is suppressed by causing the solid electrolyte layer to include polyethylene glycol or sorbitol is thought to be as follows. That is, when the electrolytic solution is coagulated due to the low-temperature environment, the addition effect of polyethylene glycol or sorbitol is not likely to be exhibited within the coagulated electrolytic solution. In contrast, even if the electrolytic solution is coagulated under the low-temperature environment, polyethylene glycol or sorbitol in the solid electrolyte layer can exhibit the addition effect. Hence, polyethylene glycol or sorbitol in the solid electrolyte layer exhibit the effect of suppressing the decrease of the capacitance under the low-temperature environment.

However, even if other kinds of solvent such as ethylene glycol is included in the electrolytic solution in addition to the sulfolane-based solvent, the same effect is achieved, and other kind of solvent may be also included in the electrolytic solution as long as the sulfolane-based solvent is included. Moreover, these effects are not limited by the addition amount of sorbitol, and some sorbitol may be eluted in the electrolytic solution according to the concentration gradient between the solid electrolyte layer and the electrolytic solution.

For example, the cation components included in the solid electrolyte layer may be inorganic alkali such as sodium hydroxide, potassium hydroxide, calcium hydroxide, and ammonia, aliphatic amines such as ethylamine, diethylamine, methylethylamine, and triethylamine, aromatic amines such as aniline, benzylamine, pyrrole, imidazole, pyridine, and derivatives thereof, nitrogen-containing compounds such as N-methyl-pyrrolidone, N,N-dimethylformamide, N,N-dimethylacetamide, hexamethylphosphortriamide, N-methylpyrrolidone, N-methylformamide, and N-vinylacetamide, sodium alkoxide such as sodium methoxide and sodium ethoxide, metal alkoxide such as potassium alkoxide and calcium alkoxide, and organic alkali such as dimethyl sulfoxide. These cation components may be used in single or in combination of two or more.

Typically, the cation component included in the electrolytic solution is added in the electrolytic solution by salt of organic acid, salt of inorganic acid, or salt of complex compound of organic acid and inorganic acid, and the cation component and the anion component may be added in the electrolytic solution at an equal amount. The cation component may be added in the electrolytic solution in single or in combination of two or more types of salts. However, only acid that becomes the anion component may be added to the solvent, or acid that becomes the anion component and base that becomes the cation component may be added separately to the solvent.

At least one salt of organic acid, inorganic acids, and composite compound of organic acid and inorganic acid may be ammonium salt, quaternary ammonium salt, quaternarized aminidium salt, amine salt, sodium salt, and potassium salt. Quaternary ammonium ions of the quaternary ammonium salt may be tetramethylammonium, triethylmethylammonium, and tetraethylammonium. The quaternized aminidium salt may be ethyldimethylimidazolium and tetramethylimidazolium. The amine salt may be primary amine, secondary amine, and tertiary amine. The primary amine may be methylamine, ethylamine, and propylamine, the secondary amine may be dimethylamine, diethylamine, ethylmethylamine, and dibutylamine, and the tertiary amines may be trimethylamine, triethylamine, tributylamine, ethyldimethylamine, and ethyldiisopropylamine.

The cation component is added to the electrolyte layer so that the molecular ratio of the cation component relative to 1 mol of dopable functional group becomes 6 or less. Within such a range, ESR of the solid electrolytic capacitor is suppressed at low even after thermal stress is applied. The condition in which the thermal stress is applied means general conditions in which thermal stress is applied to the solid electrolytic capacitor, such as at the time of a reflow process, and the utilization of the solid electrolytic capacitor under high-temperature environment.

The dopable functional group means a functional group that can contribute to the doping reaction of the dopant. Not all of the functional groups that can contribute to the doping reaction of the dopant have to be involved in the doping reaction of the conjugated polymer, and for example, some of the functional groups which can contribute to the doping reaction of the dopant may be doped, and the remaining may not be doped. Moreover, all of the functional groups that can contribute to the doping reaction of the dopant may be doped. That is, among the functional groups of the dopant, the dopable functional group is not the functional group that is involved to the doping reaction, but is the functional group that can contribute to the doping reaction. The dopable functional group is not particularly limited, and may be inorganic acid, sulfo group, carboxy group, and hydroxy group.

The cation component included in the electrolyte layer is a total amount of the cation component included in the electrolyte layer regardless of whether or not the cation component is derived from the electrolytic solution or the solid electrolyte layer. More specifically, when the solid electrolyte layer includes the cation component and the electrolytic solution does not include the cation component, the cation component included in the electrolyte layer is the cation component derived from the solid electrolyte layer, and the total amount of the cationic component derived from the solid electrolyte layer is defined relative to 1 mol of the dopable functional group. Moreover, when the solid electrolyte layer does not include the cation component and the electrolytic solution includes the cation component, the cation component included in the electrolyte layer is the cation component derived from the electrolytic solution, and the cation component in the electrolytic solution is defined relative to 1 mol of the dopable functional group. Furthermore, when both the solid electrolyte layer and the electrolytic solution include the cation component, the cation component included in the electrolyte layer is the total amount of the cation component derived from the solid electrolyte layer and the cation component derived from the solution defined relative to 1 mol of the functional group that can contribute to the doping reaction of the dopant. Moreover, the electrolyte layer may include no cation component, and the cation component may be zero.

Although it is not limited to the following reason, it is assumed that the reason why the ESR is suppressed low when the molecular ratio of the cation component relative to 1 mol of the dopable functional group is 6 or less is as follows. That is, the cation component neutralizes the dopant and transfers the conductive polymer from bipolaron to polaron, such that the conductivity of the conductive polymer is improved and the ESR of the solid electrolyte capacitor is decreased. Furthermore, the heat stress causes a first phenomenon of transferring the conductive polymer from bipolaron to polaron by facilitating the neutralization action of the dopant by the cation component, and a second phenomenon of facilitating the dedoping reaction of the dopant by facilitating the action of the cation component to the dopant. Accordingly, it is assumed that a balance of the first phenomenon and the second phenomenon is related to the molecular ratio of the cation component relative to 1 mol of the dopable functional group.

As a result, it is assumed that, if the molecular ratio of the cation relative to 1 mol of the dopable functional group is more than 3.5 and 6 or less, the second phenomenon by the application of heat stress is relatively suppressed so that the effect of the first phenomenon by the loading of stress remains, and the conductive polymer is transferred from bipolaron to polaron. In contrast, if said molecular ratio is more than 6, the second phenomenon becomes largely superior, and as a result, the ESR after the application of heat stress becomes large In particular, in the electrolyte layer, it is preferable that the molecular ratio of the cation relative to 1 mol of the dopable functional group is 3.5 or less. If said molecular ratio is more than 2.8 and 3.5 or less, the effect of the first phenomenon by the application of heat stress becomes large, and the increase in the ESR of the solid electrolytic capacitor after the application of heat stress is suppressed lower than that in the range of more than 3.5 and 6 or less, and as a result, the ESR of the solid electrolytic capacitor after the application of heat stress is further suppressed lower.

Furthermore, it is preferable the molecular ratio of the cation relative to 1 mol of the dopable functional group is 2.8 or less. If said molecular ratio is more than 1.4 and 2.5 or less, the first phenomenon by the application of heat stress would act superior than the second phenomenon, and the ESR after the application of heat stress is suppressed equally or lower than the ESR before the application of heat stress.

In addition, it is preferable that the molecular ratio of the cation relative to 1 mol of the dopable functional group is 1.4 or less. If said molecular ratio is 1.4 or less, the first phenomenon by the application of heat stress would act superior than the second phenomenon, and the ESR of the solid electrolytic capacitor would no change before and after the the application of heat stress, and the ESR of the solid electrolytic capacitor after the application of heat stress can be further maintained lower.

The anion component may be included at the equimolar amount to the cation component, may be under-included in comparison with the cation component, or may be excessively included in comparison with the cation component. That is, the molecular ratio between the acid component and the base component in the electrolyte layer may be arbitrary. As long as the cation component included in the electrolyte layer is defined relative to 1 mol of the dopable functional group, in all cases in which the anion component and the cation component are at an equal quantity, the cation component is excessively contained, and the anion component is excessively contained, the ESR of the solid electrolytic capacitor after the thermal stress is applied is suppressed low.

The organic acid that would be the anion component may be carboxylic acid such as oxalic acid, succinic acid, glutaric acid, pimelic acid, suberic acid, sebacic acid, phthalic acid, isophthalic acid, terephthalic acid, maleic acid, adipic acid, benzoic acid, salicylic acid, toluic acid, enanthic acid, malonic acid, 1,6-decanedicarboxylic acid, 1,7-octanedicarboxylic acid, azelaic acid, resorcinic acid, phloroglucinic acid, gallic acid, gentisic acid, protocatechuic acid, pyrocatechuic acid, trimellitic acid, and pyromellitic acid, dodecanedioic acid, 11-vinyl-8-octadecenedioic acid, phenols, and sulfonic acid. In addition, the inorganic acid may be boric acid, phosphoric acid, phosphorus acid, hypo phosphorus acid, carbonic acid, and silicic acid may be cited. As the composite compoind of organic acid and inorganic acid, borodisalicylic acid, borodioxalic acid, borodimalonic acid, borodisuccinic acid, borodiadipic acid, borodiazelaic acid, borodicarboxylic acid, borodimaleic acid, borodilactic acid, boroditartaric acid, borodicitric acid, borodiphthalic acid, borodi(2-hydroxy)isobutyric acid, borodiresorcinic acid, borodimethylsalicylic acid, borodinaphthoic acid, borodimandelic acid, and borodi(3-hydroxy)propionic acid.

A preferable anion component is aliphatic carboxylic acid having a carbon number of main chain being 4 or more. By using the aliphatic carboxylic acid having carbon number of main chain of 4 or more as the anion component, even if the amount of the anion component relative to 100 g of the electrolytic solution is equal to or smaller than 17 mmol, the corrosive deterioration of the dielectric oxide film can be suppressed. In other words, even if the cation component is contained at the molecular ratio of 3.5 or less relative to 1 mol of the functional group that can contribute to the doping reaction of the dopant, the corrosive deterioration of the dielectric oxide film can be suppressed. Moreover, since the molecular ratio of the cation component relative to 1 mol of the functional group that can contribute to the doping reaction of the dopant is 3.5 or less, the increase of the ESR after the thermal stress is applied is remarkably suppressed.

Note that example aliphatic carboxylic acid having carbon number of main chain of 4 or more may be adipic acid, azelaic acid, 1,6-decane-dicarboxylic acid, 1,7-octane-dicarboxylic acid, and 11-vinyl-8-octadecenedioic acid A further preferable anion component is azelaic acid. By using azelaic acid as the anion component, even if the amount of the anion component relative to 100 g of the electrolytic solution is equal to or smaller than 8 mmol, the corrosive deterioration of the dielectric oxide film can be suppressed. In other words, even if the cation component is included at the molecular ratio of 1.4 or less relative to 1 mol of the functional group that can contribute to the doping reaction of the dopant, the corrosive deterioration of the dielectric oxide film can be suppressed and the increase of the ESR after the thermal stress is applied is simultaneously suppressed.

The solvent to which the anion component and the cation component are added is sulfolane. The affinity of the sulfolane to the solid electrolyte layer and the anode foil is relatively low in comparison with that of ethylene glycol etc., and it is considered that the contact frequency between the chlorine ion contained in the solvent and the anode foil relatively decreases. Hence, when sulfolane is used as the solvent, the corrosive deterioration of the dielectric oxide film can be suppressed. Moreover, sulfolane has a higher melting point than those of ethylene glycol and γ-butyrolactone, and although it is expected that the electrolytic solution containing sulfolane generally easily solidifies, according to the solid electrolytic capacitor that utilizes both the solid electrolyte and the electrolytic solution, the deterioration of the capacitance under the low-temperature environment, such as equal to or higher than −55° C. and equal to or lower than 5° C., is little.

The solvent is not limited to sulfolane, and may be a sulfolane-based solvent including a cyclic sulfone structure. The sulfolane-based solvent includes sulfolane and the derivative of sulfolane. Example derivatives of sulfolane are ones in which one or more hydrogen atoms coupled to carbon atoms forming a ring are substituted with alkyl group, such as 3-methyl-sulfolane, and 2,4-dimethyl-sulfolane.

Moreover, the solvent for the electrolytic solution may be a mixture of a sulfolane-based solvent and other solvents. The other solvents are not limited to any particular solvent, however, polyhydric alcohol is preferable. Although the electrolytic solution including polyhydric alcohol as the solvent has the chlorine-ion resistance lower than that of the electrolytic solution including γ-butyrolactone as the solvent, the time-course deterioration of the capacitance (ΔCap) does not become apparent unlike γ-butyrolactone. Example polyhydric alcohol may be ethylene glycol, diethylene glycol, triethylene glycol, polyoxyethylene glycol, glycerol, polyoxyethylene glycerin, xylitol, erythritol, mannitol, dipentaerythritol, pentaerythritol, or a combination two or more kinds. The polyhydric alcohol is preferably ethylene glycol. Ethylene glycol causes a change in the higher-order structure of the conductive polymer, and thus the initial ESR characteristic is excellent, and the high-temperature characteristic also becomes excellent.

When the mixture of sulfolane-based solvent and ethylene glycol is used as the solvent, the lower limit value of the mixing ratio of the sulfolane-based solvent relative to the total amount of the sulfolane-based solvent and ethylene glycol is preferably 15 wt %, and is further preferably 25 wt %. The upper limit value of the mixing ratio of the sulfolane-based solvent relative to the total amount of the sulfolane-based solvent and ethylene glycol is preferably 75 wt % or less. When the mixing ratio is 15 wt % or more, the corrosive deterioration of the dielectric oxide film is suppressed, and the decrease of the capacitance under the low-temperature environment like −55° C. is also improved. When the mixing ratio is 25 wt % or more, the corrosive deterioration of the dielectric oxide film can be further suppressed, and the decrease of the capacitance under the low-temperature environment like −55° C. can also be further improved. When the mixing ratio 75 wt % or less, the decrease of the capacitance when a load is applied under the high-temperature environment is remarkably suppressed.

Note that the other additives may be added to the electrolytic solution. Example other additives may be complex compound of boric acid and polysaccharide (e.g., mannite, sorbitol), complex compound of boric acid and polyhydric alcohol, boric ester, nitro compound (e.g., o-nitrobenzoic acid, m-nitrobenzoic acid, p-nitrobenzoic acid, o-nitrophenol, m-nitrophenol, p-nitrophenol, and p-nitrobenzyl alcohol), and phosphoric ester. These may be used in single or in combination of two or more.

Moreover, it is preferable that the moisture percentage of the electrolytic solution is 0.01 wt % or more and 5 wt % or less. When the moisture percentage is less than 0.01 wt %, the restorability of the dielectric oxide film gets worse, and there is a possibility of leakage current becoming large. Moreover, when the moisture percentage exceeds 5 wt %, water vaporize at the time of reflow process, possibly causing the electrolytic capacitor to expand. Note that the moisture of the electrolytic solution contains both the moisture intendedly contained in the electrolytic solution, and the moisture unintendedly contained due to production environment or a production method.

(Action and Effect)

As described above, the solid electrolytic capacitor includes the capacitor element that includes the anode foil and the cathode foil facing with each other, and the electrolyte layer formed in the capacitor element. The electrolyte layer includes the solid electrolyte layer including the dopant and the conjugated polymer, and the electrolytic solution filled in the air gaps within the capacitor element on which the solid electrolyte layer is formed. Moreover, the electrolyte layer includes the cationic component of 6 or less relative to 1 mol of the functional group that can contribute to the doping reaction of the dopant. Furthermore, the electrolytic solution includes the sulfolane-based solvent. This suppresses the increase of the ESR after thermal stress is applied, eliminates the adverse effect due to the reduction of the solute, and also suppresses the corrosion by chlorine ions.

The electrolyte layer may include the aliphatic carboxylic acid with the straight-chain structure having the carbon number of 4 or more, and the cation component may be contained at the molecular ratio of 3.5 or less relative to 1 mol of the functional group that can contribute to the doping reaction of the dopant. This suppresses the deterioration of product characteristics, such as the increase of the ESR after thermal stress and the reduction of the capacitance when load is applied under the high-temperature environment, and the corrosion by chlorine ions can be further suppressed.

The electrolyte layer may include azelaic acid, and the cation component may be included at the molecular ratio of 1.4 or less relative to 1 mol of the functional group that can contribute to the doping reaction of the dopant. This suppresses the deterioration of product characteristics, such as the increase of the ESR after thermal stress and the reduction of the capacitance when load is applied under the high-temperature environment, and the corrosion by chlorine ions can be further suppressed.

Moreover, the electrolytic solution may include sulfolane-based solvert and ethylene glycol, and the mixing ratio of the sulfolane-based solvent relative to the total amount of the sulfolane-based solvent and ethylene glycol may be 25 wt % or more. This further suppresses the corrosion by chlorine ions.

Furthermore, the electrolytic solution may include the sulfolane-based solvent, and the solid electrolyte layer may include sorbitol. This suppresses the reduction of the capacitance under the low-temperature environment.

Embodiments

The solid electrolytic capacitor according to the present disclosure will be described in further detail with reference to the examples. Note that the present disclosure is not limited to the following examples.

Solid electrolytic capacitors according to comparative examples 1 to 13 and to examples 1 to 9 were produced by changing the types of the solvent in the electrolytic solution and the amount of the anion component and the cation component in the electrolyte layer. The common features of each solid electrolytic capacitor are as follows.

That is, the anode foil was an aluminum foil and was subjected to a surface enlarging process by etching, and the dielectric oxide film was formed by chemical conversion. The cathode foil was a plain foil, that is, an aluminum foil to which etching was not performed. The lead wire was connected to each of the anode foil and the cathode foil, and the anode foil and the cathode foil were caused to face with each other via a manila-based separator and were wound. The capacitor element was immersed in ammonium-dihydrogen-phosphate aqueous solution for 10 minutes, and a repair chemical conversion was performed.

Next, a dispersion solution of polyethylene-dioxythiophene (PEDOT) to which polystyrene sulfonate (PSS) had been doped was prepared, and the capacitor element was immersed therein, was taken out therefrom, and was dried for 30 minutes at 150° C. Immersion and drying were repeated for several times. Accordingly, the solid electrolyte layer was formed in the capacitor element. Next, the electrolytic solution was prepared, and the capacitor element in which the solid electrolyte layer had been formed was immersed in the electrolytic solution. This capacitor element was inserted into a cylindrical external casing with a bottom, a sealing rubber was attached to the opened end, and the casing was sealed by swaging.

Each solid electrolytic capacitor was subjected to an aging process by voltage application. The rated withstand voltage of each produced solid electrolytic capacitor was 35 WV, the rated capacitance thereof was 47 µF, and the size thereof was 6.1 mm in diameter and 6.3 mm in height.

The electrolytic solution prepared for the solid electrolytic capacitors according to the comparative examples 1 to 11 and the example 1 to 9 are shown in the following table 1.

In the above table 1, the composition ratio of the solvent shows the weight percentage relative to the total amount of the solvent. As shown in the above table 1, each of the solid electrolytic capacitors had different composition and composition ratio of the solvent for the electrolytic solution. Moreover, each of the solid electrolytic capacitors had different amounts of the cation component and the anion component, and therefore the molecular ratio of the cation component included in the electrolyte layer relative to 1 mol of the dopable functional group was different. In table 1, EG indicates ethylene glycol, TMS indicates sulfolane, GBL indicates γ-butyrolactone, AzA indicates azelaic acid, TEA indicates triethylamine, and NH3 indicates ammonia.

As shown in table 1, in the solid electrolytic capacitors of the examples 1 to 9 and the comparative examples 1 to 8 and 11, the molecular ratio of the cation component included in the electrolyte layer was 6 or less relative to 1 mol of the dopable functional group. In contrast, in the solid electrolytic capacitors of the comparative examples 9 and 10, the molecular ratio of the cation component contained in the electrolyte layer relative to 1 mol of the dopable functional group exceeded 6.

Moreover, in the solid electrolytic capacitors of the comparative examples 1 to 9, only ethylene glycol was used as the solvent for the electrolytic solution. In contrast, in the solid electrolytic capacitors of the examples 1 to 8, the solvent in the electrolytic solution included sulfolane in addition to ethylene glycol. In the solid electrolytic capacitor of the comparative example 11, only γ-butyrolactone was used as the solvent for the electrolytic solution. In contrast, in the solid electrolytic capacitor of the example 9, the solvent in the electrolytic solution included sulfolane in addition to γ-butyrolactone.

The anion component was common in the solid electrolytic capacitors according to the comparative examples 1 to 11 and the examples 1 to 9, and was azelaic acid. Moreover,

TABLE 1

| | Composition of Electrolytic Solution | | | | | | | |
|---|---|---|---|---|---|---|---|---|
| | Solvent | | | Anion Component | | Cation Component | | Molecular Ratio of Cation Component relative to 1 mol of Dopable Functional Group |
| | EG | TMS | GBL | Type of Anion | Amount of Anion Component relative to 100 g of Electrolytic Solution [mmol] | Type of Cation | Amount of Cation Component relative to 100 g of Electrolytic Solution [mmol] | |
| Comparative Example 1 | 100 | 0 | 0 | AzA | 0 | TEA | 17 | 2.8 |
| Comparative Example 2 | 100 | 0 | 0 | AzA | 17 | TEA | 17 | 2.8 |
| Comparative Example 3 | 100 | 0 | 0 | AzA | 67 | TEA | 17 | 2.8 |
| Comparative Example 4 | 100 | 0 | 0 | AzA | 2 | TEA | 2 | 0.4 |
| Comparative Example 5 | 100 | 0 | 0 | AzA | 4 | TEA | 4 | 0.7 |
| Comparative Example 6 | 100 | 0 | 0 | AzA | 6 | TEA | 6 | 1.1 |
| Comparative Example 7 | 100 | 0 | 0 | AzA | 8 | TEA | 8 | 1.4 |
| Comparative Example 8 | 100 | 0 | 0 | AzA | 13 | TEA | 13 | 2.1 |
| Comparative Example 9 | 100 | 0 | 0 | AzA | 50 | TEA | 50 | 8.4 |
| Example 1 | 75 | 25 | 0 | AzA | 2 | TEA | 2 | 0.4 |
| Example 2 | 75 | 25 | 0 | AzA | 4 | TEA | 4 | 0.7 |
| Example 3 | 75 | 25 | 0 | AzA | 6 | TEA | 6 | 1.1 |
| Example 4 | 75 | 25 | 0 | AzA | 8 | TEA | 8 | 1.4 |
| Example 5 | 75 | 25 | 0 | AzA | 13 | TEA | 13 | 2.1 |
| Example 6 | 75 | 25 | 0 | AzA | 17 | TEA | 17 | 2.8 |
| Example 7 | 75 | 25 | 0 | AzA | 21 | TEA | 21 | 3.5 |
| Example 8 | 75 | 25 | 0 | AzA | 33 | TEA | 33 | 5.6 |
| Comparative Example 10 | 75 | 25 | 0 | AzA | 50 | TEA | 50 | 8.4 |
| Example 9 | 0 | 50 | 50 | AzA | 17 | NH3 | 17 | 2.8 |
| Comparative Example 11 | 0 | 0 | 100 | AzA | 17 | NH3 | 17 | 2.8 | the cation component was common in the solid electrolytic capacitors according to the comparative examples 1 to 10 and the examples 1 to 8, and was triethylamine. Ammonia was used as the cation component in the example 9 and the comparative example 11.

The ESR before and after thermal stress was applied, the change rate of the capacitance, and the presence of the corrosive deterioration of the dielectric oxide film were measured for each of the solid electrolytic capacitors. First, the ESR before the thermal stress was applied for each solid electrolytic capacitor was measured at 20° C. that is the normal temperature. Subsequently, each solid electrolytic capacitor was left for 60 hours at 150° C., and was further left at the normal temperature, and the ESR after the thermal stress was applied by this reflow process was measured. The ESR was measured at 100 kHz.

Moreover, DC voltage of 35 V was applied to each solid electrolytic capacitor for 800 hours under the temperature environment of 150° C. Before and after the voltage application, the capacitance was measured at 120 Hz. Next, the change rate of the capacitance after the voltage application relative to the capacitance before the voltage application was calculated.

Moreover, for respective solid electrolytic capacitors, the solid electrolytic capacitor to which 50 ppm of chlorine ions were added, and the solid electrolytic capacitor to which chlorine ion was intendedly not added were prepared. 35 V was applied to the solid electrolytic capacitor to which 50 ppm of chlorine ions were added, and the solid electrolytic capacitor to which chlorine ion was intendedly not added at 150° C., and the ESR was measured at each elapsed time within 1000 hours at the maximum. Next, it was assumed that the dielectric oxide film corroded when the ESR of the solid electrolytic capacitor to which 50 ppm of chlorine ions were added became equal to or greater than 10 times the ESR of the solid electrolytic capacitor to which chlorine ion was intendedly not added. When the ESR did not reach 10 times as much within 1000 hours, it was assumed that there was no corrosion in the dielectric oxide film. Note that the ESR was measured at 100 kHz The ESR of each solid electrolytic capacitor before thermal stress was applied, the ESR after the thermal stress was applied, the change rate of the capacitance, and the presence of the corrosive deterioration of the dielectric oxide film are shown in the following table 2.

TABLE 2

| | Composition of Electrolyte Layer Solvent | Total Amount in Electrolyte Layer Molecular Ratio of Cation Component relative to 1 mol of Dopable Functional Group | ESR [Ω/100 kHz] Before Themal Stress was applied | ESR [Ω/100 kHz] After Themal Stress was applied | Change Rate of Capacitance (ΔCap) [%] | Corrosion Deterioration |
|---|---|---|---|---|---|---|
| Comparative Example 1 | EG only | ≤6 | 0.17 | 0.26 | −4.8 | Present |
| Comparative Example 2 | | | 0.16 | 0.25 | −3 | Present |
| Comparative Example 3 | | | 0.15 | 0.24 | −3.1 | Present |
| Comparative Example 4 | | | 0.84 | 0.17 | −3.2 | Present |
| Comparative Example 5 | | | 0.86 | 0.19 | −3.5 | Presen |
| Comparative Example 6 | | | 0.44 | 0.17 | −3.2 | Present |
| Comparative Example 7 | | | 0.5 | 0.19 | −3.3 | Present |
| Comparative Example 8 | | | 0.27 | 0.22 | −3.4 | Present |
| Comparative Example 9 | | >6 | 0.13 | 6.37 | −3.8 | Non |
| Example 1 | TMS included | ≤6 | 0.84 | 0.19 | −3.1 | Non |
| Example 2 | | | 0.87 | 0.2 | −3.2 | Non |
| Example 3 | | | 0.42 | 0.17 | −3.3 | Non |
| Example 4 | | | 0.51 | 0.21 | −3 | Non |
| Example 5 | | | 0.27 | 0.23 | −3.1 | Non |
| Example 6 | | | 0.27 | 0.2 | −3.2 | Non |
| Example 7 | | | 0.12 | 0.71 | −3.3 | Non |
| Example 8 | | | 0.11 | 2.62 | −3.3 | Non |
| Comparative Example 10 | | | 0.15 | 6.52 | −3.8 | Non |
| Example 9 | GBL + TMS | >6 | 0.35 | 0.36 | −27.7 | Non |
| Comparative Example 11 | GBL only | ≤6 | 0.35 | 0.36 | −46.1 | Non |

When comparing the comparative examples 1 to 8, since the molecular ratio of the cation component relative to 1 mol of the dopable functional group was 6 or less in all comparative examples, the increase of the ESR after the thermal stress was applied is suppressed. However, in the solid electrolytic capacitors of the comparative examples 1 to 8, the molecular ratio of the cation component relative to 1 mol of the dopable functional group was less than 3.5, and the corrosive deterioration occurred on the dielectric oxide film due to the insufficient amount of solute. Note that as is clear from the comparison among the comparative examples 1 to 3, even if the anion component was made excessive to increase the total amount of the anion component and the cation component, the corrosive deterioration of the dielectric oxide film cannot be suppressed.

In contrast, in the solid electrolytic capacitor of the comparative example 9, since the molecular ratio of the cation component relative to 1 mol of the dopable functional group was more than 6, the corrosive deterioration did not occur on the dielectric oxide film due to the sufficient amount of solute. However, the ESR after thermal stress was applied keenly increased.

Moreover, since the solid electrolytic capacitor of the comparative example 10 included sulfolane as the solvent and the molecular ratio of the cation component relative to 1 mol of the dopable functional group was more than 6, the corrosion of the dielectric oxide film was not observed. However, in the solid electrolytic capacitor of the comparative example 10, since the molecular ratio of the cation component relative to 1 mol of the dopable functional group was more than 6, the ESR after thermal stress was applied keenly increased.

Furthermore, in the solid electrolytic capacitor of the comparative example 11, since the solvent was γ-butyrolactone only, the corrosion of the dielectric oxide film was not observed, however the change rate of the capacitance became worse as 1.6 times or more in comparison with the change rate of the capacitance in the example 9.

value equal to or less than 6 relative to 1 mol of the dopable functional group Furthermore, it was observed that, by using ethylene glycol as the solvent to be mixed with sulfolane, the deterioration of the product characteristic that is the change rate of the capacitance is also suppressed.

Next, the solid electrolytic capacitors according to examples 10 to 14 and to a comparative example 12 in which ratios of ethylene glycol and sulfolane in the electrolytic solution had been changed were produced. The solid electrolytic capacitors of the examples 10 to 14 and to the comparative example 12 were produced by the same production scheme and the same condition as the examples 1 to 9 other than the composition of the electrolytic solution.

The compositions of the electrolytic solutions of the solid electrolytic capacitors according to the examples 10 to 14 and the comparative example 12 are shown in the following table 3.

TABLE 3

| | Composition of Electrolytic Solution | | | | | | | |
|---|---|---|---|---|---|---|---|---|
| | Solvent | | | Anion Component | | Cation Component | | Molecular Ratio of |
| | | | | Type of Anion | Amount of Anion Component relative to 100 g of Electrolytic Solution [mmol] | Type of Cation | Amount of Cation Component relative to 100 g of Electrolytic Solution [mmol] | Cation Component relative to 1 mol of Dopable Functional Group |
| | EG | TMS | GBL | | | | | |
| Comparative Example 12 | 100 | 0 | 0 | AzA | 17 | NH3 | 17 | 2.8 |
| Example 10 | 85 | 15 | 0 | AzA | 17 | NH3 | 17 | 2.8 |
| Example 11 | 75 | 25 | 0 | AzA | 17 | NH3 | 17 | 2.8 |
| Example 12 | 50 | 50 | 0 | AzA | 17 | NH3 | 17 | 2.8 |
| Example 13 | 25 | 75 | 0 | AzA | 17 | NH3 | 17 | 2.8 |
| Example 14 | 0 | 100 | 0 | AzA | 17 | NH3 | 17 | 2.8 |

In contrast, as shown in table 2, in the solid electrolytic capacitors of the examples 1 to 9, since the molecular ratio of the cation component relative to 1 mol of the dopable functional group was 6 or less, the increase of the ESR after thermal stress was applied was suppressed. Moreover, since sulfolane was included in the solvent, like the solid electrolytic capacitors of the examples 1 to 6, even if the molecular ratio of the cation component relative to 1 mol of the dopable functional group was less than 3.5, that is, regardless of the value of the molecular ratio of the cation component was relative to 1 mol of the dopable functional group, the corrosive deterioration did not occur on the dielectric oxide film.

Furthermore, in the solid electrolytic capacitors of the examples 1 to 8, the change rate of the capacitance was excellent. However, in the solid electrolytic capacitor of the example 9, since γ-butyrolactone was contained in the solvent, the change rate of the capacitance was inferior in comparison with the examples 1 to 8.

Hence, for the solid electrolytic capacitor, by using sulfolane as the solvent, it was observed that the deterioration of the product characteristic that is the ESR after thermal stress was applied is suppressed while suppressing the corrosive deterioration of the dielectric oxide film if the value of the molecular ratio of the cation component is any As shown in the above table 3, the electrolytic solutions according to the examples 10 to 14 and the comparative example 12 used ammonia as the cation component. The electrolytic solution according to the comparative example 12 used ethylene glycol only as the solvent, the electrolytic solution according to the example 14 used sulfolane only as the solvent, and the electrolytic solutions according to the examples 10 to 13 used the mixture of ethylene glycol and sulfolane as the solvent. The electrolytic solutions according to the examples 10 to 13 had different composition ratios of ethylene glycol and sulfolane.

The low-temperature characteristics of the solid electrolytic capacitors according to the examples 10 to 14 and the comparative example 12 were tested. That is, each solid electrolytic capacitor was left under an environment of −55° C. for 40 hours. The capacitance before and after the solid electrolytic capacitors had been left under the low-temperature environment was measured, and the change rate of the capacitance before and after solid electrolytic capacitors had been left was calculated. Moreover, by referring the change rate of the capacitance in the comparative example 12, the improvement rates of the change rates of the capacitances of the solid electrolytic capacitors according to the examples 10 to 14 relative to the comparative example 12 were calculated. The results are shown in the following table 4

TABLE 4

|  | Composition of Electrolytic Solution Solvent | | | Total Amount in Electrolyte Layer Molecular Ratio of Cation Component relative to 1 mol of Dopable Functional Group | Change Rate of Capacitance (ΔCap) [%] | Improvement Rate |
|---|---|---|---|---|---|---|
|  | EG | TMS | GBL | | | |
| Comparative Example 12 | 100 | 0 | 0 | 2.8 | −15 | — |
| Example 10 | 85 | 15 | 0 | 2.8 | −14 | 7 |
| Example 11 | 75 | 25 | 0 | 2.8 | −12 | 20 |
| Example 12 | 50 | 50 | 0 | 2.8 | −10 | 33 |
| Example 13 | 25 | 75 | 0 | 2.8 | −8 | 47 |
| Example 14 | 0 | 100 | 0 | 2.8 | −7 | 53 |

As shown in table 4, it was observed that, in the solid electrolytic capacitors according to the examples 10 to 14, a change in capacitance under the low-temperature environment was suppressed in comparison with the solid electrolytic capacitor according to the comparative example 12. Moreover, it was also observed that the higher the mixing ratio of sulfolane in the solvent is, the more the change in the capacitance under the low-temperature environment is improved.

Hence, in the solid electrolytic capacitor, the change in the capacitance under the low-temperature environment can be suppressed by setting the molecular ratio of the cation component to be 6 or less relative to 1 mol of the dopable functional group and by including sulfolane as the solvent.

Solid electrolytic capacitors according to examples 31 to 33 and a comparative example 13 were produced, and the change in the capacitance under the low-temperature environment was further observed. The combination of additives included in each of the solid electrolyte layers of the solid electrolytic capacitors according to the examples 31 to 33 and the comparative example 13 are shown in the following table 5.

included in the electrolytic solution, and the solvent was ethylene glycol only, and sorbitol was added to the solid electrolyte layer. That is, only the solid electrolytic capacitor of the example 32 had sorbitol included in the solid electrolyte layer and had sulfolane included as the solvent for the electrolytic solution.

Sorbitol and polyethylene glycol were included in the solid electrolyte layer by adding them to dispersion solution when the solid electrolyte layer was formed in the capacitor element. More specifically, sorbitol or polyethylene glycol was added at a rate of 8 wt % to the dispersion solution of polyethylene-dioxythiophene (PEDOT) to which polystyrene sulfonate (PSS) was doped, and the capacitor element was immersed in this dispersion solution. Moreover, ammonium azelate was added as the solute to the electrolytic solutions of the examples 31 to 33 and the comparative example 13, and the amount of the anion component and the amount of the cation component relative to 100 g of the electrolytic solution were both 4 mmol. Furthermore, in the electrolytic solutions of the examples 31 to 33 and the comparative example 13, the molecular ratio of the cation component relative to 1 mol of the dopable functional group was 0.7.

TABLE 5

| | | Composition of Electrolytic Solution | | | | | | |
|---|---|---|---|---|---|---|---|---|
| | | Solvent | | Anion Component | | Cation Component | | Total Amount of Electrolyte Layer Molecular Ratio of Cation Component relative to 1 mol of Dopable Functional Group |
| | Additive in Solid Electrolyte Layer | EG | TMS | Type of Anion | Amount of Anion Component relative to 100 g of Electrolytic Solution [mmol] | Type of Cation | Amount of Cation Component relative to 100 g of Electrolytic Solution [mmol] | |
| Comparative Example 13 | Sorbitol | 100 | 0 | AzA | 4 | NH3 | 4 | 0.7 |
| Example 31 | Non | 35 | 75 | AzA | 4 | NH3 | 4 | 0.7 |
| Example 32 | Sorbitol | 25 | 75 | AzA | 4 | NH3 | 4 | 0.7 |
| Example 33 | Polyethylene Glycol | 25 | 75 | AzA | 4 | NH3 | 4 | 0.7 |

As shown in the above table 5, in the solid electrolytic capacitor of the example 32, sulfolane was included in the electrolytic solution as the solvent, and sorbitol was added to the solid electrolyte layer. In contrast, although sulfolane was included in the electrolytic solution of the example 31 as the solvent, an additive such as sorbitol was not added to the solid electrolyte layer. Although sulfolane was included in the electrolytic solution of the example 33 as the solvent, polyethylene glycol was added to the solid electrolyte layer instead of sorbitol. Moreover, in the solid electrolytic capacitor of the comparative example 13, sulfolane was not The low-temperature characteristics of the solid electrolytic capacitors according to the examples 31 to 33 and the comparative example 13 were tested. Each solid electrolytic capacitor was left under −55° C. environment for 436 hours, and the capacitance before and after the solid electrolytic capacitors were left under the low-temperature environment was measured. Next, the change rate of the capacitance before and after the solid electrolytic capacitors were left under the low-temperature environment was calculated. The results are shown in the following table 6

TABLE 6

|  | Additive in Solid Electrolyte Layer | Composition of Electrolytic Solution Solvent | | Change Rate of Capacitance (ΔCap) [%] |
| --- | --- | --- | --- | --- |
|  |  | EG | TMS |  |
| Comparative Example 13 | Sorbitol | 100 | 0 | −40.9 |
| Example 31 | Non | 25 | 75 | −38.5 |
| Example 32 | Sorbitol | 25 | 75 | −11.2 |
| Example 33 | Polyethylene Glycol | 25 | 75 | −35.3 |

As shown in table 6, in the solid electrolytic capacitors of the examples 31 to 33, the change in the capacitance under the low-temperature environment was suppressed more in comparison with the solid electrolytic capacitor of the comparative example 13. Moreover, according to the examples 32 and 33 in which sulfolane was included as the solvent of the electrolytic solution and sorbitol or polyethylene glycol was included in the solid electrolyte layer, the change in the capacitance under the low-temperature environment was suppressed more than the example 31.

Among the solid electrolytic capacitors according to the examples 31 to 33, in the solid electrolytic capacitor according to the example 32 in which sulfolane was used as the solvent of the electrolytic solution and sorbitol was included in the solid electrolyte layer, the change in the capacitance under the low-temperature environment was significantly suppressed. Hence, it was observed that, in the solid electrolytic capacitor, when sulfolane is used as the solvent of the electrolytic solution and sorbitol or polyethylene glycol is included in the solid electrolyte layer, the change in the capacitance under the low-temperature environment is further suppressed. Furthermore, it was observed that, when sorbitol is included in the solid electrolyte layer, the change in the capacitance under the low-temperature environment is significantly suppressed.

Furthermore, the ESR before thermal stress was applied, the ESR after the thermal stress was applied, the change rate of the capacitance, and the presence of the corrosive deterioration of the dielectric oxide film in the solid electrolytic capacitors of the examples 10 to 14 and of the comparative example 12 are shown in the following table 7. Note that each measuring scheme and measuring condition were the same as those for the solid electrolytic capacitors according to the examples 1 to 9 and to the comparative examples 1 to 11.

As shown in the above table 7, it was observed that, when sulfolane is used as the solvent, the corrosion of the dielectric oxide film can be suppressed while suppressing the deterioration of the product characteristics. It was observed that, when the mixing ratio of sulfolane relative to the total amount of the solvent is 15 wt % or more, the corrosion of the dielectric oxide film can be further suppressed. Moreover, it was observed that, when the mixing ratio of sulfolane relative to the total amount of the solvent is 25 wt % or more, the corrosion of the dielectric oxide film can be further suppressed, and no corrosive deterioration was observed for 1000 hours. Furthermore, it was observed that, when the mixing ratio of sulfolane relative to the total amount of the solvent is 75 wt % or more, the change rate of the capacitance can be further suppressed.

Still further, the solid electrolytic capacitors according to examples 15 to 30 were produced by changing the kinds of the anion component and the molecular ratio of the cation component relative to 1 mol of the dopable functional group.

In the solid electrolytic capacitors of the example 11 and the examples 15 to 30, phthalic acid, salicylic acid, succinic acid, glutaric acid, adipic acid, azelaic acid, dodecanedioic acid, 1,6-decanedicarboxylic acid, 1,7-octanedicarboxylic acid, and 11-vinyl-8-octadecenedioic acid were added to the respective electrolytic solutions of the solid electrolytic capacitors, as the respective anion components. Phthalic acid and salicylic acid are aromatic carboxylic acid. Succinic acid, glutaric acid, adipic acid, azelaic acid, dodecanedioic acid, 1,6-decanedicarboxylic acid, 1,7-octanedicarboxylic acid, and 11-vinyl-8-octadecenedioic acid are aliphatic carboxylic acid.

Note that the carbon number of the main chain is 4 for adipic acid, is 7 for azelaic acid, 10 for dodecanedioic acid, 10 for 1,6-decanedicarboxylic acid, 8 for 1,7-octanedicarboxylic acid, and 16 for 11-vinyl-8-octadecenedioic acid.

Moreover, the ESR before thermal stress was applied, the ESR after thermal stress was applied, the change rate of the capacitance, and the presence of the corrosive deterioration of the dielectric oxide film in the solid electrolyte capacitors of the example 11 and the examples 15 to 30 were measured. The measuring schemes and measuring conditions were the same as those for the solid electrolytic capacitors of the examples 1 to 9 and the comparative examples 1 to 11.

The composition of the electrolytic solution of the electrolytic capacitors according to the examples 15 to 22 are shown in the following table 8.

TABLE 7

|  | Composition of Electrolytic Solution Solvent | | | Total Amount in Electrolyte Layer Molecular Ratio of Cation Component relative to 1 mol of Dopable Functional Group | ESR [Ω/100 kHz] | | Change Rate of Capacitance (ΔCap) [%] | Corrosion Deterioration |
| --- | --- | --- | --- | --- | --- | --- | --- | --- |
|  | EG | TMS | GBL |  | Before Thermal Stress was applied | After Thermal Stress was applied |  |  |
| Comparative Example 12 | 100 | 0 | 0 | 2.8 | 0.26 | 0.26 | −3 | Present |
| Example 10 | 85 | 15 | 0 | 2.8 | 0.26 | 0.26 | −3.2 | Non |
| Example 11 | 75 | 25 | 0 | 2.8 | 0.26 | 0.26 | −3.2 | Non |
| Example 12 | 50 | 50 | 0 | 2.8 | 0.26 | 0.26 | −3.3 | Non |
| Example 13 | 25 | 75 | 0 | 2.8 | 0.26 | 0.27 | −3.9 | Nou |
| Example 14 | 0 | 100 | 0 | 2.8 | 0.29 | 0.3 | −6.6 | Non |

TABLE 8

| | Composition of Electrolytic Solution | | | | | | Total Amount of Electrolyte Layer Molecular Ratio of Cation Component relative to 1 mol of Dopable Functional Group |
|---|---|---|---|---|---|---|---|
| | Solvent | | Anion Component | | Cation Component | | |
| | EG | TMS | Type of Anion | Amount of Anion Component relative to 100 g of Electrolytic Solution [mmol] | Type of Cation | Amount of Cation Component relative to 100 g of Electrolytic Solution [mmol] | |
| Example 15 | 75 | 25 | Phthalic Acid | 34 | NH3 | 34 | 5.6 |
| Example 16 | 75 | 25 | Salicylic Acid | 34 | NH3 | 34 | 5.6 |
| Example 17 | 75 | 25 | Succinic Acid | 34 | NH3 | 34 | 5.6 |
| Example 18 | 75 | 25 | Glutaric Acid | 34 | NH3 | 34 | 5.6 |
| Example 19 | 75 | 25 | Adipic Acid | 34 | NH3 | 34 | 5.6 |
| Example 20 | 75 | 25 | Azelaic Acid | 34 | NH3 | 34 | 5.6 |
| Example 21 | 75 | 25 | Dodecanedioic Acid | 34 | NH3 | 34 | 5.6 |
| Example 22 | 75 | 25 | 1,6-Decanedicarboxylic Acid | 34 | NH3 | 34 | 5.6 |

As shown in the above table 8, in the solid electrolytic capacitors of the examples 15 to 22, various types of anion components were added, and sulfolane was used as the solvent. Moreover, the molecular ratio of the cation component relative to 1 mol of the dopable functional group was 3.5 or more and 6 or less.

Various types of the measuring results for the solid electrolytic capacitors according to the examples 15 to 22 are shown in the following table 9.

TABLE 9

| | Composition of Electrolytic Solution | | | Total Amount of Electrolyte Layer Molecular Ratio of Cation Component relative to 1 mol of Dopable Functional Group | ESR [Ω/100 kHz] | | Change Rate of Capacitance (ΔCap) [%] | Corrosion Deterioration |
|---|---|---|---|---|---|---|---|---|
| | Solvent | | Anion Component | | Before Themal Stress was applied | After Themal Stress was applied | | |
| | EG | TMS | Type of Anion | | | | | |
| Example 15 | 75 | 25 | Phthalic Acid | 5.6 | 0.13 | 0.39 | −3.5 | Non |
| Example 16 | 75 | 25 | Salicylic Acid | 5.6 | 0.1 | 0.42 | −3.2 | Non |
| Example 17 | 75 | 25 | Succinic Acid | 5.6 | 0.12 | 0.38 | −3 | Non |
| Example 18 | 75 | 25 | Glutaric Acid | 5.6 | 0.13 | 0.37 | −2.8 | Non |
| Example 19 | 75 | 25 | Adipic Acid | 5.6 | 0.12 | 0.38 | −3.1 | Non |
| Example 20 | 75 | 25 | Azelaic Acid | 5.6 | 0.11 | 0.39 | −3.3 | Non |
| Example 21 | 75 | 25 | Dodecanedioic Acid | 5.6 | 0.12 | 0.4 | −3.2 | Non |
| Example 22 | 75 | 25 | 1,6-Decanedicarboxylic Acid | 5.6 | 0.11 | 0.42 | −3.1 | Non |

As shown in the above table 9, according to the results of the solid electrolytic capacitors of the examples 15 to 22, it was observed that, regardless of the type of the anion component, when sulfolane is used as the solvent and the molecular ratio of the cation component relative to 1 mol of the dopable functional group is 3.5 or more and 6 or less, the corrosion of the dielectric oxide film can be suppressed while suppressing the deterioration of the product characteristics.

Next, the composition of the electrolyte solution of the electrolytic capacitors of the example 11 and to the examples 23 to 30 are shown in the following table 10.

TABLE 10

| | Composition of Electrolytic Solution | | | | | | Total Amount of Electrolyte Layer Molecular Ratio of Cation Component relative to 1 mol of Dopable Functional Group |
|---|---|---|---|---|---|---|---|
| | Solvent | | Anion Component | | Cation Component | | |
| | EG | TMS | Type of Anion | Amount of Anion Component relative to 100 g of Electrolyte Solution [mmol] | Type of Cation | Amount of Cation Component relative to 100 g of Electrolytic Solution [mmol] | |
| Example 23 | 75 | 25 | Azelaic Acid | 4 | TEA | 4 | 0.7 |
| Example 24 | 75 | 25 | Adipic Acid | 8 | TEA | 8 | 1.4 |

TABLE 10-continued

| | Composition of Electrolytic Solution | | | | | | Total Amount of Electrolyte Layer |
|---|---|---|---|---|---|---|---|
| | Anion Component | | | | Cation Component | | |
| | Solvent | | | Amount of Anion Component relative to 100 g of Electrolyte Solution | Type of | Amount of Cation Component relative to 100 g of Electrolyte Solution | Molecular Ratio of Cation Component relative to 1 mol of Dopable Functional |
| | EG | TMS | Type of Anion | [mmol] | Cation | [mmol] | Group |
| Example 25 | 75 | 25 | Azelaic Acid | 8 | TEA | 8 | 1.4 |
| Example 26 | 75 | 25 | Adipic Acid | 17 | TEA | 17 | 2.8 |
| Example 11 | 75 | 25 | Azelaic Acid | 17 | TEA | 17 | 2.8 |
| Example 27 | 75 | 25 | Dodecanedioic Acid | 17 | TEA | 17 | 2.8 |
| Example 28 | 75 | 25 | 1,6-Decanedicarboxylic Acid | 17 | TEA | 17 | 2.8 |
| Example 29 | 75 | 25 | 1,7-Octanedicarboxylic Acid | 17 | TEA | 17 | 2.8 |
| Example 30 | 75 | 25 | 11-vinyl-8-octadecenedioic Acid | 17 | TEA | 17 | 2.8 |

As shown in the above table 10, in the solid electrolytic capacitors of the example 11 and the examples 2 to 30, various types of anion components were added, sulfolane was used as the solvent, and the molecular ratio of the cation component relative to 1 mol of the dopable functional group were 1.4 or more and 6 or less.

Various types of measuring results for the solid electrolytic capacitors according to the example 11 and the examples 23 to 30 are shown in the following table 11.

TABLE 11

| | Composition of Electrolytic Solution | | | Total Amount of Electrolyte Layer Molecular Ratio of Cation Component relative to 1 mol of Dopable Functional Group | ESR [Ω/100 kHz] | | Change Rate of Capacitance (ΔCap) [%] | Corrosion Deterioration |
|---|---|---|---|---|---|---|---|---|
| | Solvent | | Anion Component | | Before Thermal Stress was applied | After Thermal Stress was applied | | |
| | EG | TMS | Type of Anion | | | | | |
| Example 23 | 75 | 25 | Azelaic Acid | 0.7 | 0.55 | 0.15 | −3.9 | Non |
| Example 24 | 75 | 25 | Adipic Acid | 1.4 | 0.43 | 0.17 | −3.8 | Non |
| Example 25 | 75 | 25 | Azelaic Acid | 1.4 | 0.44 | 0.17 | −3.8 | Non |
| Example 26 | 75 | 25 | Adipic Acid | 2.8 | 0.27 | 0.26 | −3.3 | Non |
| Example 11 | 75 | 25 | Azelaic Acid | 2.8 | 0.26 | 0.26 | −3.2 | Non |
| Example 27 | 75 | 25 | Dodecanedioic Acid | 2.8 | 0.29 | 0.29 | −3.3 | Non |
| Example 28 | 75 | 25 | 1,6-Decanedicarboxylic Acid | 2.8 | 0.28 | 0.29 | −3.2 | Non |
| Example 29 | 75 | 25 | 1,7-Octanedicarboxylic Acil | 2.8 | 0.27 | 0.28 | −3.1 | Non |
| Example 30 | 75 | 25 | 11-vinyl-8-octadecenedioic Acid | 2.8 | 0.26 | 0.28 | −3 | Non |

As shown in the above table 11, it was observed that, when aliphatic carboxylic acid that had the carbon number of the main chain of equal to or greater than 4 was used as the anionic component and sulfolane was used as the solvent, even if the molecular ratio of the cation component relative to 1 mol of the dopable functional group was 3.5 or less, the corrosion of the dielectric oxide film can be suppressed while suppressing the deterioration of the product characteristics. Regarding the molecular ratio of the cation component relative to 1 mol of the dopable functional group, since the example 11 and examples 23 to 30 were smaller than the examples 15 to 22, it was observed that the increase of the ESR after thermal stress had been applied was further suppressed.

Note that in the solid electrolytic capacitor according to the example 23, no corrosion of was confirmed on the dielectric oxide film even 1500 hours had elapsed. That is, when the sulfolane-based solvent is included in the solvent and the anion component is azelaic acid, even if the molecular ratio of the cation component relative to 1 mol of the dopable functional group is small, the corrosion of the dielectric oxide film was suppressed.

The ESR after thermal stress was applied is shown in the following table 12 for each molecular ratio of the cation component relative to 1 mol of the dopable functional group.

TABLE 12

| | Composition of Electrolyte Layer | | | | | Total Amount of Electrolyte Layer | ESR [Ω/100 kHz] | |
|---|---|---|---|---|---|---|---|---|
| | Anion Component | | | Cation Component | | | | |
| | | | Amount of | | Amount of | Molecular Ratio of | | |
| | Solvent EG | Type of Anion | Anion Component relative to 100 g of Electrolytic Solution [mmol] | Type of Cation | Cation Component relative to 100 g of Electrolytic Solution [mmol] | Cation Component relative to 1 mol of Dopable Functional Group | Before Thermal Stress was applied | After Thermal Stress was applied |
| Reference Example 1 | 100 | AzA | 17 | Triethylamine | 2 | 0.4 | 0.84 | 0.17 |
| Reference Example 2 | 100 | AzA | 17 | Triethylamine | 4 | 0.7 | 0.86 | 0.19 |
| Reference Example 3 | 100 | AzA | 17 | Triethylamine | 6 | 1.1 | 0.44 | 0.17 |
| Reference Example 4 | 100 | AzA | 17 | Triethylamine | 8 | 1.4 | 0.5 | 0.19 |
| Reference Example 5 | 100 | AzA | 17 | Triethylamine | 13 | 2.1 | 0.27 | 0.22 |
| Reference Example 6 | 100 | AzA | 17 | Triethylamine | 21 | 3.5 | 0.12 | 0.67 |
| Reference Example 7 | 100 | AzA | 17 | Triethylamine | 33 | 5.6 | 0.1 | 2.51 |
| Reference Example 8 | 100 | AzA | 17 | Triethylamine | 50 | 8.4 | 0.13 | 0.37 |

As shown in the above table 12, in the solid electrolytic capacitors of reference examples 1 to 8, only ethylene glycol was used as the solvent. The anion component was azelaic acid and was at an equal amount in all of the reference examples 1 to 8. The cation component was triethylamine, and the additive amounts differ between the reference examples 1 to 8. In addition, the reference examples 1 to 8 were produced by the same scheme and same condition as those for the solid electrolytic capacitors according to the examples 1 to 9 and the comparative examples 1 to 11, and the ESR after thermal stress was applied in the reference examples 1 to 8 was measured by the same measuring scheme and same condition those in the solid electrolytic capacitors according to the examples 1 to 9 and the comparative examples 1 to 11.

As is clear when comparing the reference example 7 with the reference example 8 in the above table 12, when the molecular ratio of the cation component relative to 1 mol of the dopable functional group was more than 3.5 and 6 or less, the ESR after thermal stress is applied was suppressed to less than half of a case in which the molecular ratio was more than 6.

As is clear when comparing the reference example 6 with the reference example 7 in the above table 12, when the molecular ratio of the cation component relative to 1 mol of the dopable functional group was more than 2.8 and 6 or less, the ESR after thermal stress is applied was significantly decreased to less than half of a case in which the molecular ratio was more than more than 3.5 and 6 or less.

As is clear when comparing the reference example 5 with the reference example 6 in the above table 12, when the molecular ratio of the cation component relative to 1 mol of the dopable functional group was more than 1.4 and 2.8 or less, the ESR after thermal stress is applied was significantly decreased to less than half of a case in which the molecular ratio was more than more than 2.8 and 3.5 or less.

As is clear when comparing the reference examples 1 to 4 with the reference example 5 in the above table 12, when the molecular ratio of the cation component relative to 1 mol of the dopable functional group was 1.4 or less, the ESR after thermal stress is applied was significantly decreased to less than half of a case in which the molecular ratio was more than more than 1.4 and 2.8 or less.

The invention claimed is:

1. A solid electrolytic capacitor comprising:
a capacitor element including an anode foil and a cathode foil facing each other; and
an electrolyte layer formed in the capacitor element, wherein:
the electrolyte layer includes:
a solid electrolyte layer including a dopant and a conjugated polymer; and
an electrolyte solution filled in air gaps in the capacitor element on which the solid electrolyte layer is formed,
the electrolyte layer includes a cation component,
the cation component is included at a molecular ratio of more than 0 and 6 or less relative to 1 mol of a functional group which can contribute to a doping reaction of the dopant, and
the electrolytic solution includes a sulfolane-based solvent.

2. The solid electrolytic capacitor according to claim 1, wherein the electrolyte layer includes aliphatic carboxylic acid in which a carbon number of a main chain is 4 or more as an anion component.

3. The solid electrolytic capacitor according to claim 2, wherein the cation component is included at the molecular ratio of 3.5 or less relative to 1 mol of the functional group capable of contributing to the doped reaction of the dopant.

4. The solid electrolytic capacitor according to claim 2, wherein the aliphatic carboxylic acid may be azelaic acid.

5. The solid electrolytic capacitor according to claim 4, the cation component is included at the molecular ratio of 1.4 or less relative to 1 mol of the functional group capable of contributing to the doped reaction of the dopant.

6. The solid electrolytic capacitor according to any one of claims 2 to 5, wherein the anion component is included at an equimolar amount to the cation component.

7. The solid electrolytic capacitor according to any one of claims 1 to 5, wherein:
the electrolytic solution includes ethylene glycol together with the sulfolane-based solvent, and
a mixing ratio of the sulfolane-based solvent relative to a total amount of the sulfolane-based solvent and the ethylene glycol may be 25 wt % or more.

8. The solid electrolytic capacitor according to any one of claims 1 to 5, wherein the sulfolane-based solvent is at least one selected from sulfolane, 3-methyl-sulfolane, and 2,4-dimethyl-sulfolane.

9. The solid electrolytic capacitor according to any one of claims 1 to 5, wherein the solid electrolyte layer includes sorbitol.

10. The solid electrolytic capacitor according to claim 1, wherein the cation component is included at the molecular ratio of 0.4 or more and 6 or less relative to 1 mol of the functional group capable of contributing to the doped reaction of the dopant.

* * * * *